United States Patent [19]

Knoblauch et al.

[11] Patent Number: 5,179,058

[45] Date of Patent: Jan. 12, 1993

[54] PROCESS FOR MANUFACTURING A CARBONACEOUS CATALYST FOR THE REDUCTION OF NITROGEN OXIDES IN EXHAUST GASES

[75] Inventors: Karl Knoblauch; Ekkehard Richter; Hans-Jürgen Schmidt, all of Essen, Fed. Rep. of Germany

[73] Assignee: Bergwerksverband GmbH, Essen, Fed. Rep. of Germany

[21] Appl. No.: 707,571

[22] Filed: May 30, 1991

[51] Int. Cl.$^5$ .............. B01J 21/18; B01J 37/22; B01D 53/36

[52] U.S. Cl. .............. 502/181; 423/239; 502/426; 502/432

[58] Field of Search .............. 502/181, 416, 417, 426, 502/432, 434, 224

[56] References Cited

U.S. PATENT DOCUMENTS

| | | | |
|---|---|---|---|
| 1,989,108 | 1/1935 | Morrell | 502/432 |
| 3,557,020 | 1/1971 | Shihdo et al. | 502/426 |
| 3,662,523 | 5/1972 | Revoir et al. | 55/387 |
| 3,962,133 | 6/1976 | Rodewald | 502/181 |
| 4,128,499 | 12/1978 | Cohen | 502/181 |

FOREIGN PATENT DOCUMENTS

| | | |
|---|---|---|
| 2350498 | 4/1974 | Fed. Rep. of Germany . |
| 2603910 | 8/1976 | Fed. Rep. of Germany . |
| WO8808748 | 4/1988 | PCT Int'l Appl. . |

Primary Examiner—Paul E. Konopka
Attorney, Agent, or Firm—Thomas N. Ljungman

[57] ABSTRACT

A process is disclosed for treating carbonaceous catalyst with a gaseous halogen or a gaseous halogen compound to increase the catalytic activity and prolong the useful life of the catalyst. The treatment of the catalyst is conducted at temperatures above about 150 degrees C., preferably with the use of an inert gas, which inert gas is flowed through the carbonaceous material, and which inert gas carries the gaseous halogen or the gaseous halogen compound to the carbonaceous material.

20 Claims, 1 Drawing Sheet

PROCESS FOR MANUFACTURING A CARBONACEOUS CATALYST FOR THE REDUCTION OF NITROGEN OXIDES IN EXHAUST GASES

BACKGROUND OF THE INVENTION

1. Field of the Invention

This invention relates to a process for manufacturing a carbonaceous catalyst for the reduction of nitrogen oxides in exhaust gases, specifically for the catalytic reduction of nitrogen oxides in the presence of ammonia. Before use, the carbonaceous material is preferably treated with a halogen or a halogen compound to increase its catalytic activity.

2. Background Information

German Patent No. 23 50 498 discloses a process for the removal of nitrogen oxides from exhaust gases. In this process, an adsorption agent containing carbon, e.g. activated carbon, is first impregnated with an aqueous hydrogen halide solution, or with another compound which easily releases halogen. The adsorption agent is dried and then used by reacting the adsorption agent with the nitrogen oxide in the presence of amonia gas at temperatures between 60–150 degrees C. The catalytic activity of the carbonaceous material was found to increase as a result of the halogen treatment.

This process, however, has several disadvantages. First, during the reaction of the amonia with the nitrogen oxides, the halogen, e.g. bromine, is released from the catalyst, so that the catalytic activity of the catalyst decreases with use. Secondly, the released halogen reacts with ammonia to form ammonium halide. Thus, in order to remove the released halogen or the ammonium halide from the system so that they do not get released into the atmosphere, the first layer of adsorption agent must be used in conjunction with an additional layer of adsorption agent, in which the additional layer of adsorption agent is for adsorbing the released halogen or ammonium halide.

In addition, during the reduction of nitrogen oxides with ammonia on carbonaceous adsorption agents, ammonium nitrate and ammonium nitrite formation and enrichment, although negligible, have been observed when the reduction was carried out at temperatures around 100 degrees C. These substances, ammonium nitrate and ammonium nitrite, have a tendency toward spontaneous decomposition.

OBJECT OF THE INVENTION

The object of the invention is to refine the process of the type described above, so that when a carbonaceous catalyst is used in reducing nitrogen oxides, there is essentially no release of halogen or halogen compound from the catalyst so that there is essentially no loss of catalytic activity of the catalyst.

SUMMARY OF THE INVENTION

This object can be achieved by treating the carbonaceous catalyst with gaseous halogen material, which could either be a halogen itself or could be a halogen compound, as compared to the known methods of treating the carbonaceous catalyst with an aqueous solution of halogen. This type of gaseous treatment is preferably conducted at temperatures over 150 degrees C., and the gaseous halogen or gaseous halogen compound is preferably mixed with an inert gas before exposure to the carbonaceous material.

Surprisingly, tests have shown that, as a result of the treatment according to the invention, halogens are, essentially, irreversibly adsorbed out of the gas phase onto the carbonaceous adsorption materials.

The halogen that becomes essentially irreversibly bonded to the adsorption material will generally no longer react with ammonia to form ammonium halide. Thus there is substantially no removal of the halogen from the catalyst, and there is substantially no production of ammonium halide. Therefore, a comparatively small amount of halogenated catalyst is generally sufficient for the continuous removal of nitrogen oxides from exhaust gas.

An additional advantage of the process according to the invention is that essentially no ammonium nitrate or ammonium nitrite is formed on the carbonaceous adsorption agents treated according to the invention. Thus, since the formation and enrichment of ammonium nitrate and nitrite is substantially prevented, the dangers associated therewith, as mentioned previously, are essentially not present when catalysts manufactured according to the invention are used for treating exhaust gases.

Also, since the dosing of halogen or halogen compounds onto the catalyst is performed at temperatures which are higher than the temperatures at which the catalyst will later be used, the halogens or halogen compounds deposited on the carbonaceous catalyst essentially remain on the catalyst. Thus, the exhaust gas essentially will not contain any halogen impurities.

When the process according to the invention, in which the halogens are appropriately mixed with inert gas and then conducted through the layer of adsorption agent, is used for the production of a catalyst, the intensity or amount of the dosing of the halogen onto the carbonaceous material can be very precisely controlled. In this regard, it has been shown that a concentration of less than about 1% bromine is sufficient to produce effective catalysts.

One feature of the invention resides broadly in a process for manufacturing a halogenated, carbonaceous catalyst for use in the reduction of oxides in exhaust gases, the process comprising the steps of: introducing a carbonaceous material into a reactor vessel, introducing at least one halogen material into the reactor vessel, heating the reactor vessel to a predetermined temperature, adsorbing at least a portion of the at least one halogen material onto the carbonaceous material to halogenate the carbonaceous material, and discharging the halogenated carbonaceous material from the reactor vessel, wherein the predetermined temperature is a temperature at which the at least one halogen material is substantially irreversibly adsorbed onto the carbonaceous material.

Another feature of the invention resides broadly in a process for manufacturing a halogenated, carbonaceous catalyst for use in the reduction of oxides in exhaust gases, the reduction being done at a first temperature, and the process comprising the steps of: introducing a carbonaceous material into a reactor vessel, heating the carbonaceous material to a predetermined temperature, introducing a gas into the reactor vessel, the gas containing at least one gaseous halogen material, adsorbing at least a portion of the at least one halogen material from the gas onto the carbonaceous material to halogenate the carbonaceous material, and discharging the halogenated carbonaceous material from the reactor vessel, the predetermined temperature is a temperature at which the at least one halogen material is substantially irreversibly adsorbed onto the carbonaceous material.

BRIEF DESCRIPTION OF THE DRAWING

The invention is explained below in greater detail, with reference to the accompanying drawing.

DESCRIPTION OF THE PREFERRED EMBODIMENT

Figure 1:
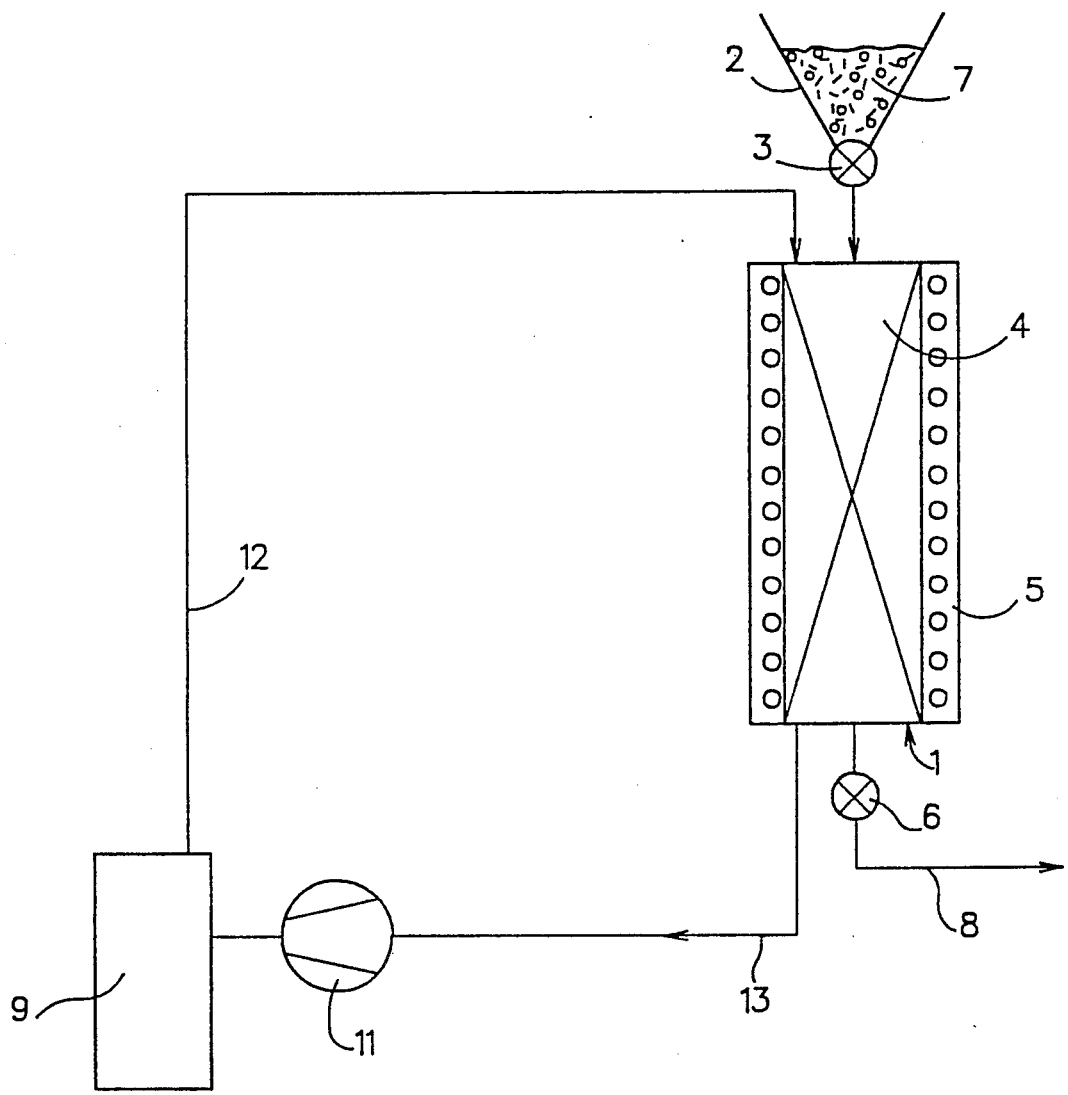
FIG. 1 is a schematic illustration of apparatus which may be used for the process according to the invention.

In the example illustrated in FIG. 1, a reactor 1 is essentially charged with a carbonaceous material 7 having catalytic properties. The carbonaceous material may be introduced into the reactor 1 by means of an input device 2 and a dosing device 3. The carbonaceous material contained in the chamber 4 of the reactor 1 is then preferably heated by means of a heating apparatus 5 to a specified temperature, preferably above about 150 degrees C.

The carbonaceous material within the chamber 4 can be in the form of a fixed bed of material or a travelling bed of material. That is, as a fixed bed of material, the carbonaceous material can be introduced all at once into the reactor 1 and then removed all at once from the reactor 1, or, as a travelling bed of material, the carbonaceous material can continuously be introduced at one end of the reactor 1 and continuously be removed from the other end of the reactor 1. To convert the carbonaceous material, which has certain catalytic properties even in the untreated state, into a significantly more effective catalyst, an inert gas containing at least one gaseous halogen or halogen compound, or possibly a mixture of at least one gaseous halogen and at least one gaseous halogen compound, can be introduced into the chamber 4 via a line 12. Preferably, the inert gas is then flowed through the fixed bed or travelling bed within the chamber 4. Examples of the gaseous halogen and/or halogen compounds which may be used are vaporized bromine and hydrogen bromide.

The admixture of the halogen and/or halogen compound to the inert gas is preferably performed in a vaporizer 9, which vaporizer 9 either mixes the halogen and/or the halogen compound with water, or already contains the premixed halogen and/or halogen compound in an aqueous solution. The mixture of water and halogen is then vaporized to a gaseous state within the vaporizer 9 and is then conducted to the reactor 1. The circulating gas essentially gives up its gaseous cargo, the halogen or the halogen compound, to the carbonaceous material while flowing through the carbonaceous material in the chamber 4. Dosing of halogen onto the carbonaceous material in this manner generally produces a more effective catalyst material. The catalyst material is then preferably removed from the chamber 4 by means of a discharge mechanism 6 and a line 8, either continuously, in the case of a travelling bed reaction, or in batches, in the case of a fixed bed reaction.

The inert gas portion of the circulating gas, with any residual cargo of gaseous halogen and/or gaseous halogen compound being transported therewith, then travels out of the chamber 4 via a line 13 and a pump 11, preferably back to the vaporizer 9, to pick up additional gaseous halogen and/or gaseous halogen compound.

As an example of the functioning of the process according to the present invention, it was demonstrated in tests that a commercially available activated carbon with the trade name D52/4 and manufactured by the applicant, could be transformed into a more effective catalyst by the application of the process according to the invention. The D52/4 activated carbon was placed in a test apparatus similar to that illustrated in FIG. 1, and was treated with bromine vapor at 50 degrees C., 100 degrees C., 150 degrees C., 180 degrees C. and 200 degrees C.

To compare the bromine-dosed activated carbon prepared according to the invention with untreated D52/4 activated carbon, the carbon samples were placed into test reactors and gas containing nitrogen oxide was flowed through the samples. The increase in the amount of NO and NH$_3$ reacted are indicated in Table 1 below.

With the catalysts which had been treated at temperatures of 50 degrees C., 100 degrees C. and 150 degrees C., bromine separations occurred in the reactor test. Such, however, was not the case with the catalysts treated at 180 degrees C. and 200 degrees C. The catalyst action of the catalysts treated above about 150 degrees C. remained present even after a test period of about 400 hours. It should be appreciated that test periods of more than 100 hours are generally sufficient for verifying the catalytic activity of activated carbon catalysts.

In practice, therefore, a significantly longer service life can be achieved for a catalyst prepared in accordance with the present invention. In additional tests, the D52/4 activated carbon was treated with hydrogen bromide, instead of with bromine, at treatment temperatures of 180 degrees C. and 200 degrees C., which temperatures had previously been identified as being favorable. As is shown by Table 1, when the D52/4 treated with hydrogen bromide was used in a test reactor, there were comparatively even better amounts of NO and NH$_3$ reacted than occurred with the use of the D52/4 treated with bromine vapor. Also, bromine separations essentially did not occur. The catalyst prepared with hydrogen bromide yielded good results even after 100 hours of test time.

In additional tests, as shown in Table 2, D52/4 activated carbon was also treated at temperatures of 180 degrees C. and 200 degrees C. with hydrogen chloride, hydrogen fluoride and hydrogen iodide. While better results were achieved with the activated carbons dosed in this manner than with activated carbon which did not receive such dosing, these results were not as favorable as the test results which were achieved with catalysts prepared with bromine and hydrogen bromide.

TABLE 2

| Charge Material treated with at | Charge Height m | Flow Volume m$^3$/h | Temp. °C. | NO | | | NH$_3$ | | |
|---|---|---|---|---|---|---|---|---|---|
| | | | | Input ppm | Output ppm | Amount Reacted % | Input ppm | Output ppm | Amount Reacted % |

Treated with Hydrogen

TABLE 2-continued

| Charge Material treated | | Charge Height | Flow Volume | Temp. | NO | | | NH₃ | | |
|---|---|---|---|---|---|---|---|---|---|---|
| | | | | | Input | Output | Amount Reacted | Input | Output | Amount Reacted |
| with | at | m | m³/h | °C. | ppm | ppm | % | ppm | ppm | % |
| Chloride | | | | | | | | | | |
| D52/4 | HCl 180° C. | 0.5 | 1.5 | 100 | 350 | 165 | 52.8 | 200 | 35 | 82.5 |
| D52/4 | HCl 200° C. | 0.5 | 1.5 | 100 | 350 | 160 | 54.3 | 200 | 35 | 82.5 |
| Treated with Hydrogen Fluoride | | | | | | | | | | |
| D52/4 | HF 180° C. | 0.5 | 1.5 | 100 | 350 | 168 | 52.0 | 200 | 40 | 80.0 |
| D52/4 | HF 200° C. | 0.5 | 1.5 | 100 | 350 | 165 | 53.0 | 200 | 40 | 80.0 |
| Treated with Hydrogen Iodide | | | | | | | | | | |
| D52/4 | HI 180° C. | 0.5 | 1.5 | 100 | 350 | 168 | 52.0 | 200 | 40 | 80.0 |
| D52/4 | HI 200° C. | 0.5 | 1.5 | 100 | 350 | 165 | 53.0 | 200 | 40 | 80.0 |

TABLE 1

| Charge Material treated | | Charge Height | Flow Volume | Temp. | NO | | | NH₃ | | | Observations |
|---|---|---|---|---|---|---|---|---|---|---|---|
| | | | | | Input | Output | Amount Reacted | Input | Output | Amount Reacted | |
| with | at | m | m³/h | °C. | ppm | ppm | % | ppm | ppm | % | |
| Untreated activated carbon D52/4 untreated | | 0.5 | 1.5 | 100 | 350 | 190 | 46.0 | 200 | 100 | 50.0 | |
| Treated with Bromine Vapor | | | | | | | | | | | |
| D52/4 | Br₂ 50° C. | 0.5 | 1.5 | 100 | 350 | 160 | 54.3 | 200 | 35 | 82.5 | Br separated |
| D52/4 | Br₂ 100° C. | 0.5 | 1.5 | 100 | 350 | 150 | 57.1 | 200 | 30 | 85.0 | |
| D52/4 | Br₂ 150° C. | 0.5 | 1.5 | 100 | 350 | 155 | 55.7 | 200 | 35 | 82.5 | Br separated |
| D52/4 | Br₂ 180° C. | 0.5 | 1.5 | 100 | 350 | 160 | 54.3 | 200 | 30 | 85.0 | Br not separated |
| D52/4 | Br₂ 200° C. | 0.5 | 1.5 | 100 | 350 | 165 | 52.8 | 200 | 45 | 77.5 | Br not separated |
| | | | | 120 | 350 | 130 | 62.8 | 200 | 0 | 100.0 | |
| | | | | 150 | 350 | 110 | 68.6 | 200 | 10 | 95.0 | |
| after 400 h test time | | | | 100 | 350 | 160 | 54.3 | 200 | 40 | 80.0 | Values remained stable or improved slightly |
| Treatment with Hydrogen Bromide | | | | | | | | | | | |
| D52/4 | HBr 180° C. | 0.5 | 1.5 | 100 | 350 | 145 | 58.6 | 200 | 30 | 85.0 | Br not separated |
| D52/4 | HBr 200° C. | 0.5 | 1.5 | 100 | 350 | 140 | 60.0 | 200 | 30 | 85.0 | Br not separated |
| | | | | 150 | 350 | 125 | 64.3 | 200 | 10 | 95.0 | |
| after 100 h test time | | | | 100 | 350 | 140 | 60.0 | 200 | 25 | 87.5 | Values remained stable |

One aspect of the invention resides broadly in a process for the manufacture of a catalyst for the removal of nitrogen oxides from exhaust gases, with the addition of ammonia, by treatment of a carbonaceous material with a halogen or a halogen compound, characterized by the fact that the catalyst consisting of carbonaceous material is treated with the halogen or the halogen compound from the gas phase, the treatment is conducted at temperatures above 150 degrees C., and the gaseous halogen or the gaseous halogen compound is mixed with an inert gas.

Another aspect of the invention resides broadly in a process characterized by the fact that the carbonaceous material is placed in a reactor, and the gas mixture consisting of inert gas and gaseous halogen or gaseous halogen compound is conducted through the carbonaceous material in circulation.

Yet another aspect of the invention resides broadly in a process characterized by the fact that the circulating gas is transported through a vaporizer which contains the halogen or the halogen compound.

A further aspect of the invention resides broadly in a process characterized by the fact that the halogen or the halogen compound is mixed with water or is dissolved in water.

Yet a further aspect of the invention resides broadly in a process characterized by the fact that the halogen used is bromine, or the halogen compound used is a bromine compound.

A yet further aspect of the invention resides broadly in a process characterized by the fact that hydrobromic acid is used as the bromine compound.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A process for treating activated carbon to produce a catalyst for use in the reduction of oxides in exhaust gases, said process comprising;

treating the activated carbon with a gaseous halogen, chosen from the group consisting of bromine, hydrogen bromide, hydrogen fluoride, and hydrogen iodide, at a temperature greater than about 150° C. for a length of time to irreversibly bond the halogen to the activated carbon and to increase the catalytic activity for reducing oxides in exhaust gases.

2. The process according to claim 1, wherein the gaseous halogen is carried in carrier gas.

3. The process according to claim 2, wherein the carrier gas comprises an inert gas.

4. The process according to claim 1, wherein the bonded halogen is bromine.

5. The process according to claim 3, wherein the bonded halogen is bromine.

6. The process according to claim 1, wherein the bonded halogen is fluorine.

7. The process according to claim 1, wherein the bonded halogen is iodide.

8. The process according to claim 1, wherein the temperature for treating the activated carbon is less than about 200° C.

9. The process according to claim 4, wherein said treating comprises treating the activated carbon until the bromine content of the activated carbon is less than about 1%.

10. The process according to claim 1, wherein said treating comprises flowing the gas containing the gaseous halogen at a rate of about 1.5 m$^3$/hr.

11. The process according to claim 2, wherein said treating comprises flowing the gas containing the gaseous halogen at a rate of about 1.5 m$^3$/hr.

12. The process according to claim 3, wherein said treating comprises flowing the gas containing the gaseous halogen at a rate of about 1.5 m$^3$/hr.

13. The process according to claim 4, wherein said treating comprises flowing the gas containing the gaseous halogen at a rate of about 1.5 m$^3$/hr.

14. The process according to claim 5, wherein said treating comprises flowing the gaseous halogen in a gas at a rate of about 1.5 m$^3$/hr.

15. A process for treating activated carbon to produce a catalyst for use in the reduction of oxides in exhaust gases, said process comprising;

treating the activated carbon with a gas containing a gaseous halogen, chosen from the group consisting of chlorine and hydrogen chloride, within a temperature range of between about 150° C. to about 200° C. for a length of time to irreversibly bond the halogen to the activated carbon and to increase the catalytic activity for reducing oxides in exhaust gases.

16. The process according to claim 15, wherein the gaseous halogen is carried in carrier gas.

17. The process according to claim 16, wherein the carrier gas comprises an inert gas.

18. The process according to claim 15, wherein the bonded halogen is chlorine.

19. The process according to claim 18, wherein said treating comprises flowing the gas containing the gaseous halogen at a rate of about 1.5 m$^3$/hr.

20. The process according to claim 17, wherein said treating comprises flowing the gas containing the gaseous halogen at a rate of about 1.5 m$^3$/hr.

* * * * *